United States Patent
Minier-Matar et al.

(10) Patent No.: US 10,131,551 B2
(45) Date of Patent: Nov. 20, 2018

(54) SEPARATION OF KINETIC HYDRATE INHIBITORS FROM AN AQUEOUS SOLUTION

(71) Applicant: CONOCOPHILLIPS COMPANY, Houston, TX (US)

(72) Inventors: Joel Minier-Matar, Doha (QA); Samir Gharfeh, Doha (QA); Altaf Hussain, Doha (QA); Samer Adham, Doha (QA)

(73) Assignee: CONOCOPHILLIPS COMPANY, Houston, TX (US)

( * ) Notice: Subject to any disclaimer, the term of this patent is extended or adjusted under 35 U.S.C. 154(b) by 86 days.

(21) Appl. No.: 15/190,404

(22) Filed: Jun. 23, 2016

(65) Prior Publication Data
US 2016/0376171 A1  Dec. 29, 2016

Related U.S. Application Data

(60) Provisional application No. 62/183,575, filed on Jun. 23, 2015.

(51) Int. Cl.
| | | |
|---|---|---|
| *C09K 8/58* | (2006.01) | |
| *C02F 1/38* | (2006.01) | |
| *C02F 1/28* | (2006.01) | |
| *C02F 1/02* | (2006.01) | |
| *C02F 103/10* | (2006.01) | |
| *C02F 101/30* | (2006.01) | |

(52) U.S. Cl.
CPC ........... *C02F 1/385* (2013.01); *C02F 1/02* (2013.01); *C02F 1/283* (2013.01); *C02F 2101/30* (2013.01); *C02F 2103/10* (2013.01)

(58) Field of Classification Search
CPC ............. C02F 1/38; C02F 1/52; C02F 9/00
See application file for complete search history.

(56) References Cited

U.S. PATENT DOCUMENTS

| | | | | |
|---|---|---|---|---|
| 5,648,575 A * | 7/1997 | Klomp | ...... | C09K 8/52 585/15 |
| 2008/0312478 A1* | 12/2008 | Talley | ...... | C10L 3/06 585/15 |
| 2009/0057237 A1* | 3/2009 | Slabaugh | ...... | C02F 9/00 210/724 |
| 2012/0018293 A1* | 1/2012 | Kaasa | ...... | C09K 8/52 203/18 |
| 2012/0247972 A1* | 10/2012 | Spencer | ...... | C02F 1/26 205/742 |
| 2015/0112102 A1* | 4/2015 | Jensen | ...... | C09K 8/52 568/868 |

FOREIGN PATENT DOCUMENTS

| | | |
|---|---|---|
| GB | 2274850 | 8/1994 |
| WO | 2007/092702 | 8/2007 |
| WO | 2008/036696 | 3/2008 |
| WO | 2011/021092 | 2/2011 |
| WO | 2011/049858 | 4/2011 |
| WO | 2011/069510 | 6/2011 |
| WO | 2011/075671 | 6/2011 |
| WO | 2012/128910 | 9/2012 |
| WO | 2012/0241387 | 9/2012 |

OTHER PUBLICATIONS

Ahmadun et al., Review of technologies for oil and gas produced water treatment, 2009.*
Yihui Zhou, Wenbiao Wu, Keqiang Qiu, "Recycling of organic materials and solder from waste printed circuit boards by vacuum pyrolysis-centrifugation coupling technology," Waste Management, 31 (12), p. 2569-2576, Dec. 2011.
Chester J. Budziak, Eva I. Vargha-Butler, Ronald G.V. Hancock, Neumann, A. Wilhelm, "Study of fines in bitumen extracted from oil sands by heat centrifugation," Fuel, 67 (12), p. 1633-1638, Dec. 1988.
Javaid Asad, Ryan Tatiana, Berg Gayla, Pan Xiaoming, Vispute Tushar, / Bhatia, Surita R., Huber, George W., Ford, David M., "Removal of char particles from fast pyrolysis bio-oil by microfiltration." Journal of Membrane Science, 363 (1-2), p. 120-127, Nov. 2010.
Maguire-Boyle, Samuel J. / Barron, Andrew R., "A new functionalization strategy for oil/water separation membranes," Journal of Membrane Science, 382 (1-2), p. 107-115, Oct. 2011.
Nazzal, Jamal M., "The influence of grain size on the products yield and shale oil composition from the Pyrolysis of Sultani oil shale," Energy Conversion and Management, 49 (11), p. 3278-3286, Nov. 2008.
Kaufman Eric N., Harkins James B., Rodriguez Miguel Jr., Tsouris Costas, Selvaraj Punjai T., Murphy Susan E., "Development of an electro-spray bioreactor for crude oil processing," Fuel Processing Technology, 52 (1-3), p. 127-144, Nov. 1997.
Wallace Dean, Polikar Marcel, Ferracuti Frank, "Preparation of bitumen from oil sand by centrifugation," Fuel, 63 (6), p. 862-864, Jun. 1984.
Ruiz Celma, A., Lopez-Rodriguez, F., "Cogeneration plant in an olive sludge industry," Applied Thermal Engineering, 29 (16), p. 3394-3400, Nov. 2009.
Fakhru'l-Razi, A., Pendashteh Alireza, Abidin, Zurina Zainal, Abdullah Luqman Chuah, Biak Dayang Radiah Awang, Madaeni, Sayed Siavash, "Application of membrane-coupled sequencing batch reactor for oilfield produced water recycle and beneficial re-use," Bioresource Technology, 101 (18), p. 6942-6949, Sep. 2010.
Thompson, D.G.,Taylor, A.S., Graham, D.E., "Emulsification and demulsification related to crude oil production," Colloids and Surfaces, 15, p. 175-189, Jan. 1985.

(Continued)

*Primary Examiner* — William D Hutton, Jr.
*Assistant Examiner* — Avi T Skaist
(74) *Attorney, Agent, or Firm* — ConocoPhillips Company

(57) ABSTRACT

The invention relates to a process for treating an aqueous solution from a subterranean formation of an oil and gas operation. The aqueous solution can be removed from the subterranean formation and treated in a heated centrifugal separator. The heated centrifugal separator can separate the kinetic hydrate inhibitor from the aqueous solution, and then the aqueous solution can be reintroduced into the subterranean formation.

8 Claims, No Drawings

(56) References Cited

OTHER PUBLICATIONS

Bharali, P., Das, S., Konwar, B.K., Thakur, A.J., "Crude biosurfactant from thermophilic Alcaligenes faecalis: Feasibility in petro-spill bioremediation," International Biodeterioration & Biodegradation, 65 (5), p. 682-690, Aug. 2011.

McCartney, R.A., Ostvold, T., "Mass transfer of H2O between petroleum and water: Implications for oilfield water sample quality," Applied Geochemistry, 20(8), p. 1518-1532, Aug. 2005.

* cited by examiner

SEPARATION OF KINETIC HYDRATE INHIBITORS FROM AN AQUEOUS SOLUTION

CROSS-REFERENCE TO RELATED APPLICATIONS

This application is a non-provisional application which claims benefit under 35 USC § 119(e) to U.S. Provisional Application Ser. No. 62/183,575 filed Jun. 23, 2015, entitled "SEPARATION OF KINETIC HYDRATE INHIBITORS FROM AN AQUEOUS SOLUTION," which is incorporated herein in its entirety.

STATEMENT REGARDING FEDERALLY SPONSORED RESEARCH

None.

FIELD OF THE INVENTION

The present invention relates generally to separation of kinetic hydrate inhibitors from an aqueous solution. More particularly, but not by way of limitation, embodiments of the present invention use heated centrifugation to remove kinetic hydrate inhibitors from wastewater recovered from a subterranean formation.

BACKGROUND OF THE INVENTION

Gas hydrates are crystalline solids formed by water and natural gas. These hydrates can form ice-like plugs inside of pipelines for oil and gas operations which can block fluid flow and cause abrasion and deterioration to the pipe wall.

Thermodynamic hydrate inhibitors and kinetic hydrate inhibitors have been utilized to prevent or restrict the formation of these hydrates. Thermodynamic hydrate inhibitors include water removal, increasing temperature, decreasing pressure, addition of "antifreeze" to the fluid and combinations of these methods. Kinetic hydrate inhibitors interfere with the nucleation or growth of the smaller hydrate crystals and prevent them from developing into larger ones. Kinetic hydrate inhibitors can be present in wastewater recovered from oil and gas operations. It is important that these inhibitors be removed so that the wastewater can be re-used or further processed without producing solid wastes and/or generating toxic by-products. Further, kinetic hydrate inhibitors are suspected to cause problems by plugging the reservoirs when wastewater is reinjected.

Prior methods for removing kinetic hydrate inhibitors from wastewater have included bio-treatment, membrane technology, advanced oxidation processes and thermal degradation. These prior methods have proved expensive and/or ineffective. Improvements in this field of technology are therefore desired.

BRIEF SUMMARY OF THE DISCLOSURE

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the disclosed subject matter or to delineate the scope of the disclosed subject matter. Its sole purpose is to present some concepts in a simplified form as a prelude to the more detailed description that is discussed later.

In one aspect, the invention more particularly includes a process for treating an aqueous solution from a subterranean formation. The aqueous solution can be removed from the subterranean formation and introduced into a separator. At least some of a kinetic hydrate inhibitor can be separated from the aqueous solution in the separator. The aqueous solution can then be reintroduced into the subterranean formation. The aqueous solution can be treated with activated carbon before being reintroduced into the subterranean formation. The separator can be a heated centrifugal separator. A high molecular weight portion of the kinetic hydrate inhibitor can be separated from the aqueous solution. The separation can be performed at a temperature of at least about 40° C. such that at least about 6% of the kinetic hydrate inhibitor is separated from the aqueous solution in the heated centrifugal separator. The separation can also be performed at a temperature in the range from about 40° C. to about 65° C. such that the kinetic hydrate inhibitor is separated from the aqueous solution in the range from about 6% to about 45%. The separation can also be performed at a temperature of at least about 45° C. wherein at least about 32% of the kinetic hydrate inhibitor is separated from the aqueous solution in the heated centrifugal separator. The separation can also be performed at a temperature in the range from about 45° C. to about 65° C. such that the kinetic hydrate inhibitor is separated from the aqueous solution in the range from about 32% to about 45%. The separation can also be performed at a temperature of at least about 55° C. wherein at least about 41% of the kinetic hydrate inhibitor is separated from the aqueous solution in the heated centrifugal separator. The separation can also be performed at a temperature in the range from about 55° C. to about 65° C. such that the kinetic hydrate inhibitor is separated from the aqueous solution in the range from about 41% to about 45%. The separation can also be performed at a temperature of at least about 65° C. wherein at least about 45% of the kinetic hydrate inhibitor is separated from the aqueous solution in the heated centrifugal separator. The aqueous solution can comprise wastewater. The wastewater can comprise brine.

In another aspect, the invention can include a process for removing at least some of a kinetic hydrate inhibitor from an aqueous solution. The aqueous solution can be treated in a separator. At least about 6% of the kinetic hydrate inhibitor can be separated from the aqueous solution in the separator, wherein the separation is performed at a temperature of at least about 40° C. The separator can comprise a heated centrifugal separator. The separation can be performed at a temperature in the range from about 40° C. to about 65° C. such that the kinetic hydrate inhibitor is separated from the aqueous solution in the range from about 6% to about 45%. The separation can also be performed at a temperature of at least about 45° C. wherein at least about 32% of the kinetic hydrate inhibitor is separated from the aqueous solution in the heated centrifugal separator. The separation can also be performed at a temperature in the range from about 45° C. to about 65° C. such that the kinetic hydrate inhibitor is separated from the aqueous solution in the range from about 32% to about 45%. The separation can also be performed at a temperature of at least about 55° C. wherein at least about 41% of the kinetic hydrate inhibitor is separated from the aqueous solution in the heated centrifugal separator. The separation can also be performed at a temperature in the range from about 55° C. to about 65° C. such that the kinetic hydrate inhibitor is separated from the aqueous solution in the range from about 41% to about 45%. The separation can also be performed at a temperature of at least about 65° C. wherein at least about 45% of the kinetic hydrate inhibitor is separated from the aqueous solution in the heated centrifugal separator. The aqueous solution can comprise wastewater from a subterranean formation in an oil and gas operation. The wastewater can comprise brine. The aqueous solution can also be treated with activated carbon.

While certain embodiments will be described in connection with the preferred illustrative embodiments shown herein, it will be understood that it is not intended to limit the invention to those embodiments. On the contrary, it is intended to cover all alternatives, modifications, and equivalents, as may be included within the spirit and scope of the invention as defined by the claims.

DETAILED DESCRIPTION

Disclosed herein are various illustrative embodiments of a process for treating an aqueous solution from a subterranean formation in an oil and gas operation. The aqueous solution can be removed from the subterranean formation and treated in a separator. The separator can separate a kinetic hydrate inhibitor from the aqueous solution, and then the aqueous solution can be reintroduced into the subterranean formation. As used herein, the term "subterranean formation" can include a deep well injection.

Also disclosed herein are various illustrative embodiments of a process for removing a kinetic hydrate inhibitor from an aqueous solution. In certain illustrative embodiments, the aqueous solution can be treated in a separator, and at least about 32% of the kinetic hydrate inhibitor can be separated from the aqueous solution in the separator when the separation is performed at a temperature of at least about 45° C.

In certain illustrative embodiments, the aqueous solution can include produced water from a subterranean formation. For example, the aqueous solution can be wastewater which may include brine. A brine solution may be any aqueous solution with a mixture of salts, including inorganic salts such as carbonates and sulfates of various metals, i.e., calcium, strontium and barium as well as complex salts of iron such as sulfides, hydrous oxides and carbonates. Although salt compositions may vary, some typical ions dissolved in brine include sodium (Na), potassium (K), magnesium (Mg), calcium (Ca), strontium (Sr), barium (Ba), iron (Fe), chloride (CI), bromide (Br), sulfate ($SO_4$), and bicarbonate ($HCO_3$). Brines can come from a variety of locations, including various production wells and ocean water. The brine solution composition will vary greatly dependent upon the reservoir being produced and the treatment being applied to the reservoir, and additionally, conditions will vary over time.

In certain illustrative embodiments, the kinetic hydrate inhibitor can include, without limitation, vinyl caprolactam, ester amides, polyester pyroglutamate, N-acylalkylene imines, 2-alkyl-2-oxazolines including PMeOx, PEtOx, PnPrOx, PiBuOx, PnBuOx and the like; N-vinyl-N-methyl acetamide; vinylpyrrolidone; PVP; tetrabutylammonium bromide; PDMAEMA; as well as homopolymers, copolymers, and mixed polymers thereof, including linear, branched and highly branched monomers and polymers. Proprietary kinetic hydrate inhibitors are available from NALCO®, Halliburton, Baker Hughes and include FREEFLOW® LDHI, among others.

As used herein, hydrates refers to ice-like structures in which water molecules, under pressure, form structures composed of polyhedral cages surrounding "guest" molecules including salts, methane, ethane or other molecules.

Kinetic hydrate inhibitors are added at well head to prevent hydrate formation while transporting the hydrocarbon mixtures through pipeline. Hydrocarbons being recovered, processed and transported may also have kinetic hydrate inhibitors added therein to prevent hydrate formation. As used herein, hydrocarbons may include natural gas, petroleum, crude oil, bitumen, tar sands, pitch, and other hydrocarbon containing materials as well as processed hydrocarbon materials including methane, ethane, butane, LNG, syngas, gasoline, fuel oil, diesel, kerosene, and the like.

In certain illustrative embodiments, the separator can be a centrifugal separator. For example, the centrifugal separator can be of the type manufactured by SIGMA Laborzentrifugen GmbH of Germany. Centrifugation is a process used to separate or concentrate materials suspended in a liquid medium. A centrifugal separator can be used for separating a product into a relatively heavy phase and a relatively light phase. In certain illustrative embodiments, the separated heavy phase can be the kinetic hydrate inhibitor and the separated light phase can be the aqueous solution.

The amount of kinetic hydrate inhibitor that is separated from the aqueous solution in the centrifugal separator can be temperature dependent. Thus, in certain illustrative embodiments, the centrifugal separator may be a heated centrifugal separator that is operated at a temperature that will produce the desired separation, depending upon the nature of the aqueous solution being processed. For example, in certain illustrative embodiments, the separation can be performed at a temperature of at least about 40° C., such that, in certain aspects, at least about 6% of the kinetic hydrate inhibitor is separated from the aqueous solution. In certain illustrative embodiments, the separation can be performed at a temperature in the range from about 40° C. to about 65° C. such that the kinetic hydrate inhibitor is separated from the aqueous solution in the range from about 6% to about 45%. Also, in certain illustrative embodiments, the separation can be performed at a temperature of at least about 45° C., such that, in certain aspects, at least about 32% of the kinetic hydrate inhibitor is separated from the aqueous solution. In certain illustrative embodiments, the separation can be performed at a temperature in the range from about 45° C. to about 65° C. such that the kinetic hydrate inhibitor is separated from the aqueous solution in the range from about 32% to about 45%. Also, in certain illustrative embodiments, the separation can performed at a temperature of at least about 55° C., such that, in certain aspects, at least about 41% of the kinetic hydrate inhibitor is separated from the aqueous solution. In certain illustrative embodiments, the separation can be performed at a temperature in the range from about 55° C. to about 65° C. such that the kinetic hydrate inhibitor is separated from the aqueous solution in the range from about 41% to about 45%. Also, in certain illustrative embodiments, the separation can be performed at a temperature of at least about 65° C., such that, in certain aspects, at least about 45% of the kinetic hydrate inhibitor is separated from the aqueous solution. In certain illustrative embodiments, the separation can be performed at a temperature of about 65° C. such that about 45% of the kinetic hydrate inhibitor is separated from the aqueous solution. It is to be understood that any recitation of numerical ranges by endpoints includes all numbers subsumed within the recited ranges as well as the endpoints of the range. The % removal is relative to the concentration of kinetic hydrate inhibitor dosed to the water. For example, when the concentration of the kinetic hydrate inhibitor is 15,000 mg/L, 45% removal is equivalent to removing 6,750 mg/L. The fraction removed was calculated based on concentration. The KHI concentration was measured by the colorimetric method.

In certain illustrative embodiments, the aqueous solution can be treated with additional materials to further separate any remaining kinetic hydrate inhibitor from the aqueous solution. For example, the aqueous solution can be treated with activated carbon as an additional step before being reintroduced into the deep well injection. In certain illustrative embodiments, the addition of powdered activated carbon can remove most of the remaining kinetic hydrate inhibitor from the aqueous solution.

The presently disclosed processes can effectively remove at least some of the kinetic hydrate inhibitor from the aqueous solution. For example, the presently disclosed processes can effectively remove the high molecular weight portion of the kinetic hydrate inhibitor from the aqueous solution. As used herein, the term "high molecular weight portion" means the portion of the polymer with large molecules compared to the rest of the polymer composition. The presently disclosed processes are efficient, cost effective and can reduce or prevent plugging when the aqueous solution is reinjected into an injection well in the subterranean formation.

The following examples of certain embodiments of the disclosed subject matter are given. Each example is provided by way of explanation of the disclosed subject matter, one of many embodiments of the disclosed subject matter, and the following examples should not be read to limit, or define, the scope of the disclosed subject matter.

A solution of kinetic hydrate inhibitor at 1.5% concentration in offshore brine was centrifuged at 2500 rpm, which is equivalent to 1488 g force. The centrifugation was carried out at several different temperatures. The centrifugation at 22° C. (ambient temperature) served as a reference point.

The centrifuge used was a Sigma 6-16 universal refrigerated table top centrifuge with a speed range up to 15,000 rpms, manufactured by SIGMA Laborzentrifugen GmbH of Germany.

The supernatants were collected and analyzed for kinetic hydrate inhibitor ("KHI") content, total organic carbon ("TOC") and for cloud point. These analyses track kinetic hydrate inhibitor concentration in solution.

The results are listed in Table 1 below:

TABLE 1

Experimental Results

| Solution Centrifuged At: | Average KHI Concentration (mg/L) | Fraction Removed (%) | Average TOC Concentration (mg/L) | Fraction Removed (%) | Cloud Point (° C.) |
|---|---|---|---|---|---|
| 22° C. | 14,261 | — | 8,748 | — | 40 |
| 35° C. | 14,488 | — | 8,841 | — | 40 |
| 40° C. | 13,341 | 6 | 8.476 | 3 | 42 |
| 45° C. | 9,750 | 32 | 7,400 | 15 | 47 |
| 55° C. | 8,465 | 41 | 6,969 | 20 | 66 |
| 65° C. | 7,872 | 45 | 6,743 | 23 | 77 |

The experimental results in Table 1 demonstrate that removal of kinetic hydrate inhibitor from the aqueous solution is a function of temperature. For example, a greater percentage of kinetic hydrate inhibitor was removed as the temperature increased above 40° C. Removal efficiency of kinetic hydrate inhibitor for the solution that was centrifuged at 65° C. was 45%. Further, the TOC value dropped by 23% and the cloud point was raised from 40° C. to 77° C. for the solution that was centrifuged at 65° C. It is believed that the fraction of kinetic hydrate inhibitor that is removed from the aqueous solution will continue to increase as the centrifugation temperature is increased, even beyond the values set forth in Table 1. Thus, these experimental results are only intended to be illustrative of the presently described subject matter and to teach one of ordinary skill in the art to make and use the described subject without undue experimentation. The examples are not intended to limit the described subject matter in any way.

The higher cloud point for the treated solution over the stock solution is indicative of less polymer present in the solution. Centrifugation above the cloud point forces the high molecular weight portion of the kinetic hydrate inhibitor to drop out of solution. The centrifugation process produces relatively small amounts of solid sludge which can be removed and incinerated.

An aqueous solution treated according to the processes disclosed herein can be successfully disposed of by deep well reinjection without affecting the permeability of the reservoir. This encourages the use of kinetic hydrate inhibitors in future oil and gas operations and suggests that kinetic hydrate inhibitors can compete efficiently with thermodynamic hydrate inhibitors such as methanol, ethanol, glycol, ethylene glycol, MEG, DEG, TEG, salts, NaCl, $CaCl_2$, KCl, and the like.

While several embodiments have been provided in the present disclosure, it may be understood that the disclosed embodiments might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or process or certain features may be omitted, or not implemented.

In addition, the various embodiments described and illustrated in the various embodiments as discrete or separate may be combined or integrated with other systems, modules, techniques, or methods without departing from the scope of the present disclosure. Other examples of changes, substitutions, and alterations are ascertainable by one skilled in the art and may be made without departing from the spirit and scope disclosed herein.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description and abstract are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:
1. "Advanced oxidation of kinetic hydrate inhibitors," International Publication No. WO 2012128910 A1, publication date: Sep. 27, 2012.
2. "Oil recovery and syngas production from biomass based processes," International Publication No. WO 2011/075671 A2, publication date: Jun. 23, 2011.
3. "Conversion of organic matter in to oil," International Publication No. WO 2011/069510 A1, publication date: Jun. 16, 2011.
4. "Conversion of organic matter in to oil," International Publication No. WO 2011/049858 A2, publication date: Apr. 28, 2011.
5. "Oil sands extraction," International Publication No. WO 2011/021092 A2, publication date: Feb. 24, 2011.
6. "Process for recovering used lubricating oils using clay and centrifugation," International Publication No. WO 2008/036696 A2, publication date: Mar. 27, 2008.
7. "Microwave assisted analytical oil-water centrifuge," International Publication No. WO 2007/092702 A2, publication date: Aug. 16, 2007.
8. "Treatment of waste petroleum," UK Patent Application Publication number GB 2274850, publication date: Aug. 10, 1994.
9. Yihui Zhou, WenBiao Wu, Keqiang Qiu, "Recycling of organic materials and solder from waste printed circuit boards by vacuum pyrolysis-centrifugation coupling technology," Waste Management, 31 (12), p. 2569-2576, December 2011.
10. Chester J. Budziak, Eva I. Vargha-Butler, Ronald G. V. Hancock, Neumann, A. Wilhelm, "Study of fines in bitumen extracted from oil sands by heat centrifugation," Fuel, 67 (12), p. 1633-1638, December 1988.
11. Javaid Asad, Ryan Tatiana, Berg Gayla, Pan Xiaoming, Vispute Tushar, /Bhatia, Surita R., Huber, George W., Ford, David M., "Removal of char particles from fast pyrolysis bio-oil by microfiltration." Journal of Membrane Science, 363 (1-2), p. 120-127, November 2010.
12. Maguire-Boyle, Samuel J./Barron, Andrew R., "A new functionalization strategy for oil/water separation membranes," Journal of Membrane Science, 382 (1-2), p. 107-115, October 2011.
13. Nazzal, Jamal M., "The influence of grain size on the products yield and shale oil composition from the Pyrolysis of Sultani oil shale," Energy Conversion and Management, 49 (11), p. 3278-3286, November 2008.
14. Kaufman Eric N., Harkins James B., Rodriguez Miguel Jr., Tsouris Costas, Selvaraj Punjai T., Murphy Susan E., "Development of an electro-spray bioreactor for crude oil processing," Fuel Processing Technology, 52 (1-3), p. 127-144, November 1997.
15. Wallace Dean, Polikar Marcel, Ferracuti Frank, "Preparation of bitumen from oil sand by centrifugation," Fuel, 63 (6), p. 862-864, June 1984.
16. Ruiz Celma, A., López-Rodríguez, F., "Cogeneration plant in an olive sludge industry," Applied Thermal Engineering, 29 (16), p. 3394-3400, November 2009.
17. Fakhru'l-Razi, A., Pendashteh Alireza, Abidin, Zurina Zainal, Abdullah Luqman Chuah, Biak Dayang Radiah Awang, Madaeni, Sayed Siavash, "Application of membrane-coupled sequencing batch reactor for oilfield produced water recycle and beneficial re-use," Bioresource Technology, 101 (18), p. 6942-6949, September 2010.
18. Thompson, D. G., Taylor, A. S., Graham, D. E., "Emulsification and demulsification related to crude oil production," Colloids and Surfaces, 15, p. 175-189, January 1985.
19. Bharali, P., Das, S., Konwar, B. K., Thakur, A. J., "Crude biosurfactant from thermophilic Alcaligenes faecalis: Feasibility in petro-spill bioremediation," International Biodeterioration & Biodegradation, 65 (5), p. 682-690, August 2011.
20. McCartney, R. A., Ostvold, T., "Mass transfer of $H_2O$ between petroleum and water: Implications for oilfield water sample quality," Applied Geochemistry, 20(8), p. 1518-1532, August 2005.

What is claimed is:

1. A process for treating an aqueous solution from a subterranean formation, the process comprising:
   removing an aqueous solution containing one or more kinetic hydrate inhibitors from a subterranean formation;
   introducing the aqueous solution into a heated centrifugal separator;
   separating a high molecular weight portion of a kinetic hydrate inhibitor from the aqueous solution in the separator by centrifuging the aqueous solution to force the high molecular weight portion of the kinetic hydrate inhibitor to drop out of the aqueous solution;
   treating the aqueous solution with activated carbon to remove remaining kinetic hydrate inhibitor from the aqueous solution; and
   reintroducing the aqueous solution into the subterranean formation.

2. The process of claim 1, wherein the separation is performed at a temperature of at least about 40° C. and wherein at least about 6% of the kinetic hydrate inhibitor is separated from the aqueous solution in the heated centrifugal separator.

3. The process of claim 1, wherein the separation is performed at a temperature in the range from about 40° C. to about 65° C. such that the kinetic hydrate inhibitor is separated from the aqueous solution in the range from about 6% to about 45%.

4. The process of claim 1, wherein the separation is performed at a temperature of at least about 45° C. and wherein at least about 32% of the kinetic hydrate inhibitor is separated from the aqueous solution in the heated centrifugal separator.

5. The process of claim 1, wherein the separation is performed at a temperature in the range from about 45° C. to about 65° C. such that the kinetic hydrate inhibitor is separated from the aqueous solution in the range from about 32% to about 45%.

6. The process of claim 1, wherein the separation is performed at a temperature of at least about 55° C. and wherein at least about 41% of the kinetic hydrate inhibitor is separated from the aqueous solution in the heated centrifugal separator.

7. The process of claim 1, wherein the separation is performed at a temperature in the range from about 55° C. to about 65° C. such that the kinetic hydrate inhibitor is separated from the aqueous solution in the range from about 41% to about 45%.

8. The process of claim 1, wherein the separation is performed at a temperature of at least about 65° C. and wherein at least about 45% of the kinetic hydrate inhibitor is separated from the aqueous solution in the heated centrifugal separator.

* * * * *